July 30, 1935.  G. V. BAUER  2,009,602

BAKING ROLL PAN

Filed Aug. 5, 1933

INVENTOR
GEORGE V. BAUER
BY Oscar T. DeWitt
ATTORNEY

Patented July 30, 1935

2,009,602

UNITED STATES PATENT OFFICE 2,009,602

BAKING ROLL PAN

George V. Bauer, Cheshire, Mass.

Application August 5, 1933, Serial No. 683,837

4 Claims. (Cl. 53—6)

My invention consists in the combination of a baking pan provided with a plurality of compartments in which each compartment consists of a separate unit.

The primary object of my invention is to provide a baking pan that may consist of any number of units, with each unit provided with a tubular member that may be inserted into the interior of the baking pan.

Another object of the invention is to provide a baking pan with a tubular member that may be inserted into the interior of the baking pan, and so arranged that when the dough in the baking pan has risen, the tubular member will provide means to form an indentation in the top of the dough and when the dough is baked the tubular member may be removed.

Another object of the invention is to provide a baking pan with a tubular member so arranged to form an indentation in the dough roll when baked, so that the roll may be used for a Frankfurter roll, and also other purposes without the necessity of using a knife to cut the roll.

The invention also consists in certain other features of construction and in combination and arrangement of the several parts, to be hereinafter specifically described, illustrated in the accompanying drawing and set forth in the appended claims.

Referring to the drawing, in which like numerals of reference designate like parts in the several figures, Figure 1 is a plan view.

Figure 1:
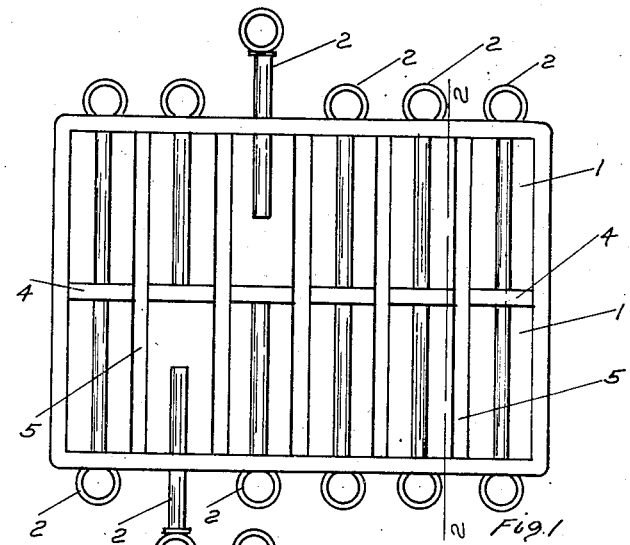
Figure 2:
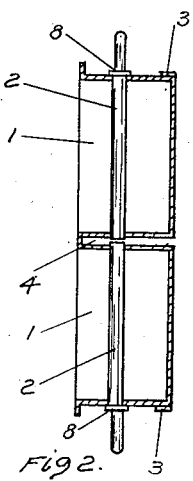
Figure 2 is an end sectional view taken on the line 2—2 of Figure 1.
Figure 3:
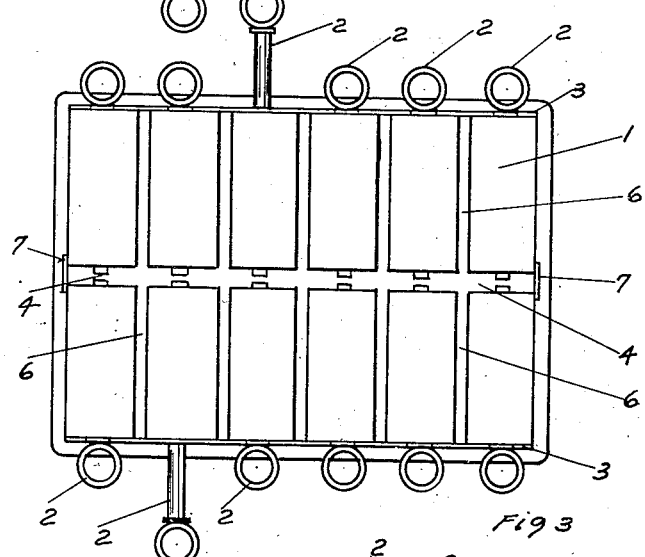
Figure 3 is a bottom view.
Figure 4:
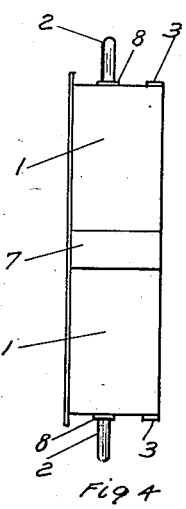
Figure 4 is an end elevation view of Figure 3.
Figure 5:
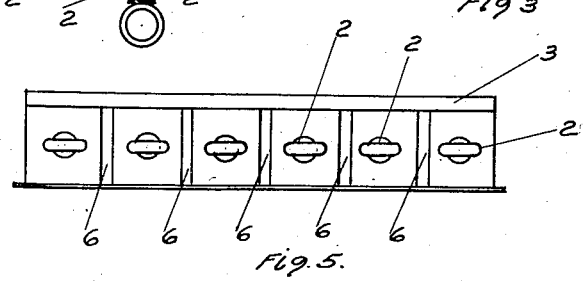
Figure 5 is a side elevation view of Figure 3.

Referring to the drawing 1 indicates the baking roll pan which is made up of separate compartments and separated by the air chambers 4 and 6. The purpose of the air chambers is to allow a free circulation about each compartment so that in the baking process the roll will be thoroughly and uniformly baked.

Each baking roll compartment is provided with a tubular member 2, which may be inserted into the interior of the pan through the side of the pan, and the inner end supported by the walls of the air chamber 4. The tubular member is provided with a stop 5 which rests against the outer portion of the pan compartment, and is of proper length so that there will be a small clearance between the tubular members within the air chamber 4. The tubular member is placed at a proper distance from the bottom of the pan so that when the dough raises in the pan, through the process of baking, it will partly cover the tubular member, and when the baking process is completed, the tubular member may be withdrawn and the roll left with an indentation in the top.

A side support member 3 is welded or sweated to each compartment and runs the entire length thereof, and is for the purpose of supporting the compartments and to provide stability to the pan. Supporting members 7 are also welded or sweated to the two outer compartments and the two inner compartments to provide further stability to the pan.

It will be understood, however, that within the spirit of the invention wide deviations may be made, such as having the tubular member placed at the bottom of the pan, or in the center of the roll, from the embodiment thereof above described.

What I claim is:

1. A roll baking pan comprising a plurality of compartments spaced adjacent each other and forming a complete unit, tubular members adapted to be inserted into interiors of the compartments to provide means to form indentations in the top of the rolls.

2. A roll baking pan comprising a plurality of compartments spaced adjacent each other and forming a complete unit, tubular members adapted to be inserted into the interiors of the compartments, and supported by the walls of the baking pan, to provide means to form indentations in the top of the roll.

3. A roll baking pan comprising a plurality of compartments provided with an air space between each compartment, the whole forming a complete unit, tubular members adapted to be inserted into the interiors of the compartments to provide means to form indentations in the top of the rolls.

4. A roll baking pan comprising a plurality of compartments spaced adjacent each other and provided with an air space between each compartment and forming a complete unit, tubular members adapted to be inserted into the interiors of the compartments and supported by the walls of the baking pan to provide means to form indentations in the top of the roll.

GEORGE V. BAUER.